United States Patent
Green

(10) Patent No.: US 7,631,408 B2
(45) Date of Patent: Dec. 15, 2009

(54) METHOD OF MANUFACTURING THIN WALL ISOGRID CASINGS

(75) Inventor: Richard Green, Bristol (GB)

(73) Assignee: Rolls-Royce PLC, London (GB)

( * ) Notice: Subject to any disclaimer, the term of this patent is extended or adjusted under 35 U.S.C. 154(b) by 818 days.

(21) Appl. No.: 11/106,539

(22) Filed: Apr. 15, 2005

(65) Prior Publication Data

US 2005/0252001 A1 Nov. 17, 2005

(30) Foreign Application Priority Data

May 13, 2004 (GB) .................................. 0410692.8

(51) Int. Cl.
*G01M 19/00* (2006.01)
*B23Q 7/00* (2006.01)
(52) U.S. Cl. .................. 29/407.05; 29/559; 29/558; 29/888; 29/888.01; 29/897.2; 29/897; 409/219; 269/289 R
(58) Field of Classification Search .................. 29/559, 29/557, 558, 888.01, 888.012, 897.2, 897, 29/888, 272, 271, 407.05, 407.1; 244/119; 409/219; 269/287, 289 R, 909, 47, 52
See application file for complete search history.

(56) References Cited

U.S. PATENT DOCUMENTS

| | | | |
|---|---|---|---|
| 3,940,891 A * | 3/1976 | Slysh ............................. 52/82 |
| 4,640,650 A * | 2/1987 | Koppers et al. ............. 405/290 |
| 4,811,962 A * | 3/1989 | Cameron, Jr. ............... 279/2.08 |
| 5,122,242 A * | 6/1992 | Slysh .......................... 205/644 |
| 5,426,842 A * | 6/1995 | DeBoalt et al. ............... 29/508 |
| 5,485,723 A * | 1/1996 | McCoy et al. ............... 60/226.1 |
| 5,826,866 A * | 10/1998 | Becker et al. ................... 269/7 |
| 6,064,352 A * | 5/2000 | Silverman et al. ........... 343/912 |
| 6,415,694 B1 * | 7/2002 | Sogoian ...................... 82/1.11 |
| 7,013,551 B2 * | 3/2006 | Green et al. .................. 29/559 |

FOREIGN PATENT DOCUMENTS

DE 3302823 A1 * 8/1984
GB 2387799 A 10/2003

* cited by examiner

*Primary Examiner*—Essama Omgba
(74) *Attorney, Agent, or Firm*—Oliff & Berridge, PLC

(57) ABSTRACT

A method of manufacturing a thin wall isogrid or the like casing by a machining process includes the steps of mating a casing with a support, the said support having a substantially continuous support surface engaging at least part of the inner or outer surface of the casing and machining a plurality of recessed pockets in the inner or outer surface of the casing opposite the surface engaged by the said support. The support reacts loads acting on the casing by a machining tool during machining, thereby minimizing distortion of the casing and tearing of the pockets being formed. During the mating process, the casing is deformed such that the support surface engages substantially the whole of the inner or outer surface of the casing.

9 Claims, 2 Drawing Sheets

METHOD OF MANUFACTURING THIN WALL ISOGRID CASINGS

BACKGROUND

This invention relates to isogrid casing structures, and in particular to a method of manufacturing thin-walled isogrid casings by machining processes.

Isogrids are used for reinforcing thin-wall components such as gas turbine engine casings or for forming lightweight lattice type structures, for example for use in space vehicle applications. An isogrid is a structure which comprises a triangular pattern of ribs arranged in rows of equal sided triangles. Isogrids are used to increase the stiffness of thin-wall structures while minimising weight. Isogrids have found particular application in gas turbine aero engine applications where thin-wall engine casing ducts are reinforced with isogrids to provide additional stiffness for supporting ancillary units and components.

GB 2387799 A (by the same applicant) discloses a method of manufacturing a thin wall isogrid casing by a chip machining process. A substantially cylindrical casing is positioned on a support, the support having a substantially continuous cylindrical support surface engaging at least part of the inner or outer surface of the casing. A plurality of recessed pockets are then machined in the said inner or outer surface of the casing opposite the surface engaged by the support. The support reacts loads acting on the casing by the chip machining tool during machining to minimise distortion of the casing and tearing of the pockets being formed. However, this method requires a filler material to be provided between the casing and the support surface to fill gaps that occur between the casing and the support due to geometric differences between the casing and the support, for example due to manufacturing tolerances resulting in slightly oval casing cross sections. The resin support may shrink during curing and the component may expand during machining, causing gaps. Hence regions of the casing may not be properly supported after the casing and support have been mated.

Prior to the invention described in the preceding paragraph it was not possible to manufacture isogrid reinforced casings where the pocket wall thickness is less than 1 mm other than by chemical machining, as described in U.S. Pat. No. 5,122,242 where it is mentioned that chemical machining can be used for producing pocket wall thicknesses and rib widths to a minimum of 0.5 mm.

SUMMARY

In chemical machining metal removal is achieved by a reverse electro plating process which produces a metal hydroxide of the metal being removed suspended as an emulsion in the electrolytic solution. Removal and disposal of the metal hydroxide emulsion is both hazardous and expensive and this combined with other factors results in significant additional cost to the machined casing.

The minimum pocket wall thickness achievable with Numerically Controlled (NC) mill cutters and the like has been limited by distortion of the casing due to cutter induced stresses resulting in rupture and tearing of the thin wall pocket sections.

There is a requirement therefore for a method of producing thin wall section isogrid reinforced casings which avoids the use of hazardous chemicals, as in chemical machining, yet readily enables pocket wall thicknesses of 1 mm or less to be achieved without rupture or damage to the isogrid due to induced machining stresses.

According to a first aspect of the invention there is provided a method of manufacturing a thin wall isogrid or the like casing by a machining process; the said method comprising the steps of:

mating a casing with a support; the said support provided with a substantially continuous support surface engaging at least part of the inner or outer surface of the casing;

machining a plurality of recessed pockets in the said inner or outer surface of the casing opposite the surface engaged by the said support; whereby the support reacts loads acting on the casing by a machining tool during machining, thereby minimising distortion of the casing and tearing of the pockets being formed, wherein, during the mating process, the casing is deformed such that the support surface engages substantially the whole of the inner or outer surface of the casing.

According to a second aspect of the invention there is provided a machining support for use in manufacturing a thin wall isogrid casing or the like by a machining process the said support comprising:

a frusto conical support of substantially circular cross-section mounted at one end on a base unit, provided with a substantially radially inwardly projecting support flange configured to mount at least one casing clamping device, said flange being provided distal to the base unit;

at least one casing locking feature provided on said base unit;

at least one casing release means provided on said base unit;

whereby, in use a casing is mated with said machining support and forced along the conical support surface towards the base unit base by use of said at least one clamping device such that the casing is deformed such that the support surface engages substantially the whole of the inner or outer surface of the casing, whereby the support reacts loads acting on the casing by a machining tool during machining, thereby minimising distortion of the casing and tearing of the pockets being formed.

Preferably a plurality of locking features are positioned such that, in use, they engage with a clamping member which engages with the casing, thereby locking the casing into a fixed position relative to the support.

The support readily enables the machining induced stresses to be supported by engagement of the casing with the support on the opposite side of the casing to that being machined. In this way the casing is sandwiched between the support and the stress inducing machining tool. This can prevent relative movement of the casing with respect to the machining tool. This can also prevent distortion of the casing and tearing and rupture of the pockets by the tool. The support can reduce the likelihood of distortion of the cylindrical casing, for example, buckling due to relatively high induced machining loads acting on the casing during machining.

Preferably, the method further comprises the step of locking the casing into a fixed position relative to the support surface throughout the machining process.

The force exerted by the act of clamping down the casing onto the support leads to the deformation of the casing. Hence gaps that occur between the casing and the support due to geometric differences between the casing and support are filled. Such geometric differences may be due to manufacturing tolerances resulting in slightly oval casing cross sections. Thus the support provides support for the casing in regions where a gap would otherwise be formed so that the support can readily support the loads acting on the casing during machining. This enables thin wall section pockets to be readily machined without damaging the pockets being formed, for example by the machining tool tearing the thin wall radial sections of the pockets which would otherwise occur without adequate support. This method is particularly advantageous when the casing is fabricated from a plurality of appropriately shaped metal plates. A typical welded casing can be up to 4 mm oval and local geometric distortions can be present around the weld lines. The effects of these geometric variations can be accommodated by the deformation of the casing during mating with the support. The method is also advantageous when the casing is made from a solid one piece forging, resulting in even better control of wall section thickness.

The present invention provides advantages over existing component clamping techniques as these all use segmented mechanical expanding fixtures which leave segment undulations in the surface of the skin because of uneven contact. Additionally the casing will be unsupported over gaps between the segments and hence will result in damage during the machining process.

In one embodiment, the casing is a fabricated frusto-conical casing and the support has a correspondingly frusto-conical support surface for engaging the casing.

In another embodiment the casing is a forged frusto-conical casing.

Preferably, the support surface engages substantially the whole of the inner or outer surface of the casing. This provides for maximum support so that the casing is fully supported with respect to the support. In this way the recessed pockets can be machined over the entire surface of the casing in a single machining operation, that is to say without repositioning the casing with respect to the support.

In preferred embodiments, the casing is machined on its radially outer surface and supported by the support on its radially inner surface. This is particularly advantageous in the embodiment where the casing comprises an engine casing and gas flow duct for a gas turbine engine since the pockets and reinforcing ribs are formed on the outer or external side of the casing with the inner surface providing a substantially smooth surface for gas flow through the engine. By machining the radially outer surface the casing can be readily supported on a support in the interior of the casing which reduces the amount of space required for machining in comparison with embodiments where the casing is supported on its outer surface and the ribs and pockets of the isogrid are machined on the inner surface. Machining the radially outer surface of the casing also more readily provides for visual inspection of the casing during machining.

Preferably the pockets are machined to have a radial thickness of less than 1 mm and in preferred embodiments the pockets are machined to have a radial thickness substantially in the range 0.45 mm to 0.85 mm. This is possible with the method of the above mentioned aspect of the invention when using a machining process since the thin wall sections (0.45 mm to 0.85 mm) are readily supported by the support during machining.

The method preferably further comprises the step of determining dimensional distortions in the support before mating with the casing and adjusting positional control parameters of the said NC controlled cutter or drill in accordance with the measured distortions.

According to another aspect of the invention there is provided an isogrid structure manufactured according to the aforementioned method.

BRIEF DESCRIPTION OF THE DRAWINGS

According to a further aspect of the invention there is provided a gas turbine engine casing having an isogrid structure manufactured according to the method of the above first mentioned aspect.

Various embodiments of the invention will now be more particularly described, by way of example, with reference to the accompanying drawings, in which.

DETAILED DESCRIPTION OF EMBODIMENTS

Figure 1:
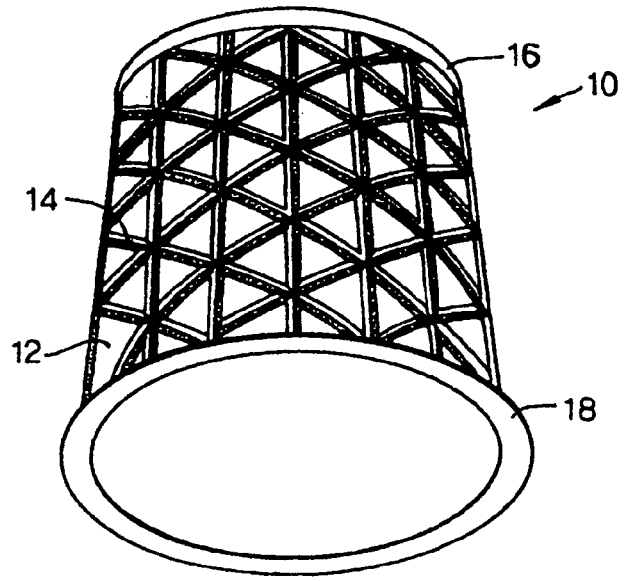
FIG. 1 is a perspective view of a gas turbine engine casing section with an isogrid reinforcement structure on an external side thereof.

Referring to FIG. 1, a generally cylindrical engine casing section 10 has an isogrid reinforcement structure machined on its outer surface. The isogrid comprises a pattern of equilateral triangular shaped pocket recesses 12 which are divided by a series of upstanding ribs 14. The triangular shaped pockets are arranged in axially extending lines across substantially the whole surface of the casing section. The pockets are formed by removing material between the ribs by chip machining in accordance with the method of the present invention. The pockets have a minimum radial wall thickness of 0.45 mm and therefore the stiffness of the casing is provided substantially by the ribs 14 arranged in the isogrid structure. Further stiffness is provided by casing radial mounting flanges 16 and 18 at opposite axial ends of the casing.

The cylindrical casing of FIG. 1 has a slight taper in the axial direction and therefore has a frusto-conical shape. The casing may be machined from either a solid forging or may be fabricated from sheet material by welding. For gas turbine engine applications it is preferred that the casing is titanium although aluminium and alloys of titanium and aluminium may also be used depending on the structural requirements.

Figure 2:
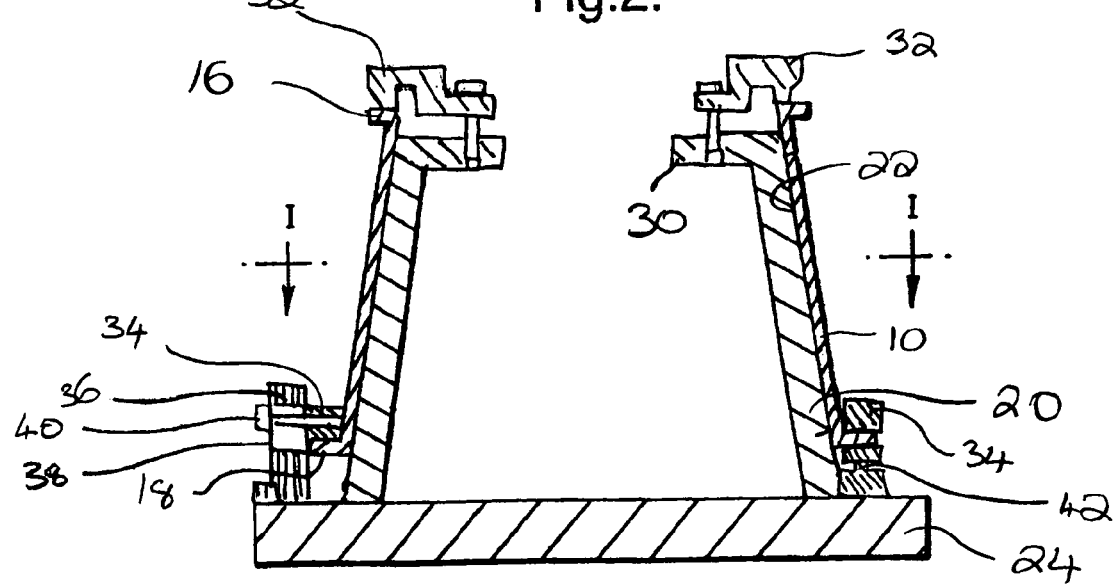
FIG. 2 is a cross-section view of a support and casing suitable for use in machining the isogrid reinforcement on the casing of FIG. 1.

In the method of manufacturing a thin wall isogrid aero engine casing by machining in accordance with the method of the present invention, the isogrid is formed by positioning the casing on a support. A support 20 suitable for machining the isogrid casing of FIG. 1 is shown in FIG. 2 with the casing 10 mounted on the support 20. The support 20 is provided with a base unit 24 which is used to mount the whole assembly for manufacturing processes such as machining and measurement. The support 20 has substantially the same shape as the casing 10 and has a radially outer support surface 22 which is substantially identical to the size and shape of the radially inner surface of the casing 10. This permits the casing 10 to be mounted concentrically and coaxially on the support 20 so that the inner surface of the casing engages the outer surface of the support over its entire surface area. The engagement between the casing 10 and support 20 may be one of interference or there may be a slight clearance to because of manufacturing tolerances which lead to gaps, which will be more particularly described with reference to FIG. 3. The support 20 also has a frusto-conical shape so that the casing substantially encloses the support.

Figure 3:
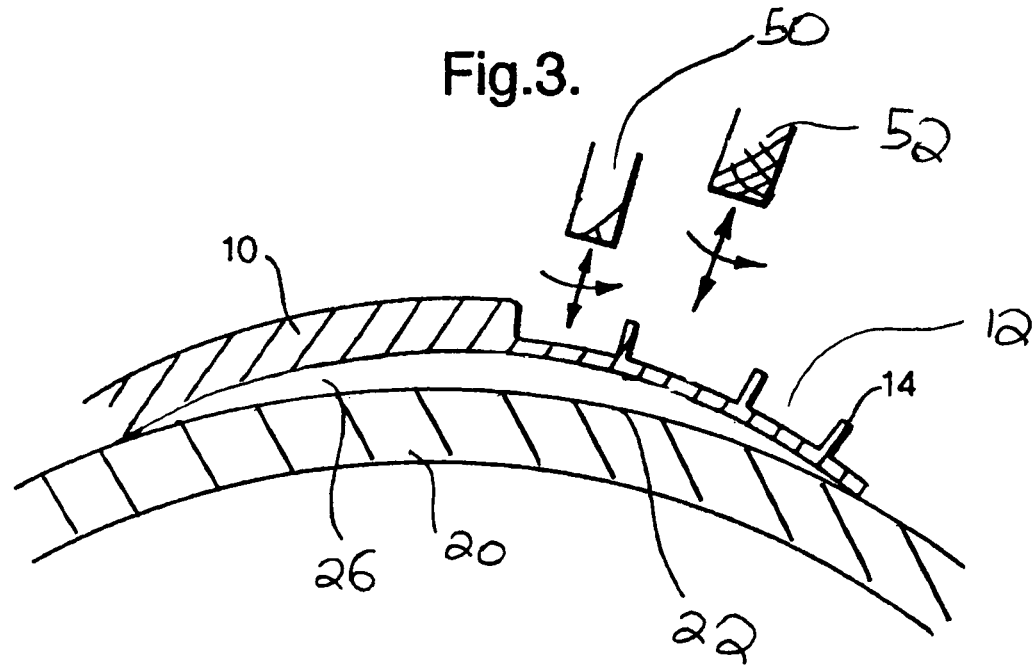
FIG. 3 is a detailed cross-section view along I-I in FIG. 2 of isogrid pockets machined on the outer surface of the casing of FIG. 1 with the casing mounted on the support.

Referring now to FIG. 3, there may be slight differences in the geometrical shape of the support surface 22 and the casing, resulting in gaps 26 between the casing and the support surface 22. Such gaps may occur locally at the support 20 and casing 10 joint due to slight differences in the dimensions of the two adjoining components, for example due to the casing 10 having a slightly oval cross section as a result of fabrication and machining tolerances.

Figure 4:
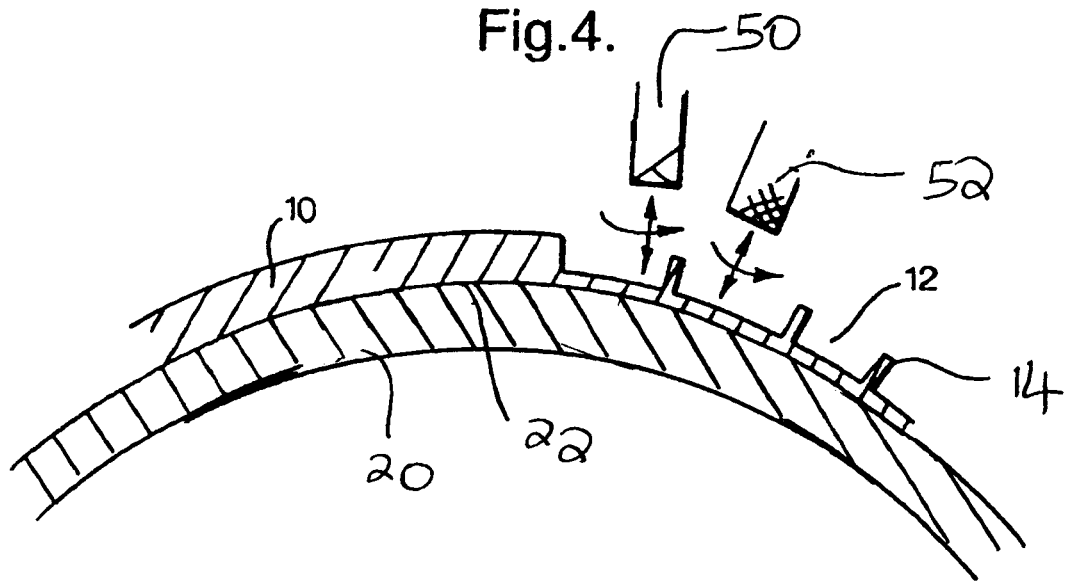
FIG. 4 is a cross-section view similar to that of FIG. 3 for a dimensionally deformed isogrid casing.

In the embodiment shown in FIG. 2, a support flange 30 extends radially inwardly from the support 20 at the end distal to the base 24. Clamps 32 are bolted to the flange 30 such that, when the casing 10 has been mated with the support 20, the clamps 32 are positioned on the casing flange 16. The clamps 32 are tightened to a predetermined torque which forces the casing 10 to slide along the support surface 22 till the casing 10 has deformed by a required amount, thereby closing any gaps 26 formed between the casing 10 and the support 20 such that the support surface 22 engages substantially the whole of the inner surface of the casing 10, as shown in FIG. 4.

A clamping ring 34, is positioned on the upper surface of the casing flange 18 and bolted to locking features 36 provided on the base unit 24 to lock the casing 10 into position relative to the support 20. The locking features 36, in the embodiment shown, take the form of members mounted perpendicular to the surface of the base unit 24. Each locking member 36 is provided with a slot 38, through which a bolt 40 is passed, the slot allowing for some degree of flexibility in the positioning of the casing 10 relative to the support 20. The bolt engages with the clamping ring 34. The clamps 30 are then released so that during manufacture the casing 10 is not caused to slide further down the support 20. If the clamps 30 are not released before the wall thickness of the casing 10 is machined and reduced in thickness, the casing 10 will be easier to deform and so may slide relative to the support 20 and become further expanded.

It will be appreciated that the use of a clamping ring 34 is not essential if the locking features 36 can be engaged directly with the casing 10 in some suitable manner so as not to cause distortion or other damage.

To remove the casing 10 from the support, a release means 42 is provided in the region underneath the casing flange 18. In this embodiment, the release means 42 is a captured bolt which can be wound out till it touches and forces the casing 10 away from the support 20.

The clamp 30 may be formed as a continuous ring or as discrete individual clamps positioned around the circumference of the support 20. The locking features 36 are provided at regular spaced intervals around the circumference of the base 24, as are the release means 38.

It will be appreciated that, depending on the casing material, and provided the casing is not expanded beyond its elastic limit, the deformation will be elastic. Hence when the casing is removed from the support it will go back to its original unstressed state.

During the machining process, in a preferred embodiment of the present method a numerically controlled (NC) rotary cutting tool in the form of a drill 50 is first used to "rough out" the pockets 12 on the outer side of the casing. The casing may have an initial radial wall thickness of 5.6 mm and the pockets may be initially drilled so that the wall thickness is reduced to 1.06 mm by the rotary drill cutter 50. During the spot drilling process the casing is supported over its entire area by the support 20 so that local distortions in the casing due to cutter induced loads do not occur. Once the pockets have been drilled they are finish machined by a second rotary cutter 52 in the form of an end mill having a 3 mm radius cutting edge so that a radius is formed between the thin wall skin sections of the pockets and the upstanding ribs 12. The end mill cutter can remove a further 0.5 mm from the pocket wall thickness so that the finish machined pocket has a wall thickness of 0.56 mm. The support 20 supports the thin wall sections of the pockets during this final machining metal removal process.

In the method described adaptive machining is preferably employed to ensure the pockets are machined to the required dimensions. In one example the casing dimensions are measured by a probe, for example, an ultra sonic measurement probe, when the casing is mounted on the support. If the NC machine tool comprising the probe detects deviations in the dimensions of the casing the NC control programme for controlling the drill and mill cutters is adjusted accordingly and the pockets are then rough machined. One, or a sample or all pockets may be re-probed to check the dimensions of the rough machine pockets before final finish machining.

It will be appreciated that before loading the casing 10 onto the support 20, the support surface 22 should be probed to find any dimensional errors. The NC machining program should then be altered to compensate for this accordingly. Since the casing 10 is deformed to take up the shape of the support 20, it is not required to probe the casing once in position. This clearly saves time in the set up of the piece for machining.

While the present invention has been described with a machining process which uses a numerically controlled and agile cutter, it will be appreciated that the support device could also be used for mounting and supporting components during grinding or turning operations or the like.

Although the invention has been described with reference to embodiments shown in the accompanying drawings it is to be understood that the invention is not so limited to those precise embodiments and that various changes and modifications may be effected without further inventive skill and effort. For example, the isogrid reinforcement may be machined on an interior surface of the casing with the support positioned around the exterior of the casing. Many different types of machining processes may be used to remove the material from the pockets including for example high speed grinding and the like.

The invention claimed is:

1. A method of manufacturing a thin wall isogrid casing by a machining process, the method comprising the steps of:

mating a casing with a support, the support provided with a substantially continuous support surface engaging at least part of the inner or outer surface of the casing;

machining a plurality of recessed pockets in the inner or outer surface of the casing opposite the surface engaged by the support, whereby the support reacts loads acting on the casing by a machining tool during machining, thereby minimizing distortion of the casing and tearing of the pockets being formed, wherein, during the mating process, the casing is deformed such that the support surface engages substantially the whole of the inner or outer surface of the casing and determining dimensional distortions in the support before mating with the casing; and adjusting positional control parameters of the NC controlled cutter or drill in accordance with the determined distortions.

2. The method as claimed in claim 1, wherein the casing is locked into a fixed position relative to the support surface throughout the machining process.

3. The method as claimed in claim 1, wherein the casing is elastically deformed during the mating process with the support.

4. The method as claimed in claim 1, wherein the casing is a fabricated frusto-conical casing.

5. The method as claimed in claim 1, wherein the casing is a forged frusto-conical casing.

6. The method as claimed in claim 1, wherein the casing is machined on its radially outer surface and supported by the support on its radially inner surface.

7. The method as claimed in claim 1, wherein the pockets are machined to have a radial thickness of less than 1 mm.

8. The method as claimed in claim 1, wherein the pockets are machined to have a radial thickness substantially in the range 0.45 mm to 0.85 mm.

9. The method as claimed in claim 1, wherein the mating process includes attaching clamps to the support and tightening the clamps with the support to a predetermined torque to force the casing to deform, thereby closing gaps formed between the casing and the support.

* * * * *